United States Patent
Tanaka et al.

(10) Patent No.: US 12,240,602 B2
(45) Date of Patent: Mar. 4, 2025

(54) LOGISTICS SYSTEM, LOGISTICS MANAGEMENT METHOD, AND COMPUTER-READABLE MEDIUM THAT STORES LOGISTICS MANAGEMENT PROGRAM

(71) Applicant: RAKUTEN GROUP, INC., Tokyo (JP)

(72) Inventors: Daiki Tanaka, Tokyo (JP); Toshiaki Tazume, Tokyo (JP); Takayoshi Inuma, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 240 days.

(21) Appl. No.: 17/890,657

(22) Filed: Aug. 18, 2022

(65) Prior Publication Data

US 2023/0067113 A1     Mar. 2, 2023

(30) Foreign Application Priority Data

Aug. 24, 2021 (JP) ................................ 2021-136399

(51) Int. Cl.
*B64C 39/02* (2023.01)
*G06Q 10/08* (2024.01)
*G06Q 10/083* (2023.01)
*G08G 5/00* (2006.01)
(Continued)

(52) U.S. Cl.
CPC ......... *B64C 39/024* (2013.01); *G06Q 10/083* (2013.01); *G08G 5/0069* (2013.01); *B64U 50/19* (2023.01); *B64U 2101/60* (2023.01)

(58) Field of Classification Search
CPC .. B64C 39/024; G06Q 10/083; G06Q 10/087; G08G 5/0069; B64U 50/19; B64U 2101/60
See application file for complete search history.

(56) References Cited

U.S. PATENT DOCUMENTS

| | | | |
|---|---|---|---|
| 2016/0253908 A1* | 9/2016 | Chambers | B64C 39/024 701/2 |
| 2018/0299880 A1 | 10/2018 | Takashima | |
| 2019/0012631 A1* | 1/2019 | Chatani | G06Q 10/083 |

(Continued)

FOREIGN PATENT DOCUMENTS

| | | |
|---|---|---|
| JP | 2019-6356 A | 1/2019 |
| JP | 2019-131068 A | 8/2019 |

(Continued)

*Primary Examiner* — Brian P Sweeney
(74) *Attorney, Agent, or Firm* — Sughrue Mion, PLLC

(57) ABSTRACT

A logistics system includes an energy remaining amount identifying unit configured to obtain or estimate an energy remaining amount of an unmanned vehicle subsequent to delivery of an item to a delivery address, the unmanned vehicle being driven by energy supplied from an energy source, a range setting unit configured to set a pickup possible range according to the energy remaining amount, the pickup possible range being used to select pickup location candidates where the unmanned vehicle is able to pick up an item and return to a station of the unmanned vehicle on a return path, the return path including the delivery address as a start point and including the station as an end point, and a pickup location determining unit configured to determine a pickup location from the pickup location candidates located in the pickup possible range.

12 Claims, 7 Drawing Sheets

(51) Int. Cl.
  *B64U 50/19* (2023.01)
  *B64U 101/60* (2023.01)

(56) References Cited

U.S. PATENT DOCUMENTS

2019/0114564 A1\* 4/2019 Ferguson ................ B64C 39/02
2020/0104965 A1 4/2020 Ramot et al.

FOREIGN PATENT DOCUMENTS

JP 2020-205122 A 12/2020
WO 2017/068871 A1 4/2017
WO 2017/115447 A1 7/2017

\* cited by examiner

| User ID | Address | Notification Information |
|---------|---------|--------------------------|
| 001 | *** | *** |
| 002 | *** | *** |
| : | : | : |

| User ID | Pickup Address | Delivery Address | Item Details | | Fee | Pickup Status |
|---------|----------------|------------------|--------------|---|-----|---------------|
| | | | Weight | Volume | | |
| 011 | *** | *** | 3kg | 80cm | *** | Pickup Completed |
| 020 | *** | *** | 4kg | 100cm | *** | Waiting for Pickup |
| : | : | : | : | : | : | : |

LOGISTICS SYSTEM, LOGISTICS MANAGEMENT METHOD, AND COMPUTER-READABLE MEDIUM THAT STORES LOGISTICS MANAGEMENT PROGRAM

BACKGROUND

1. Field

The present disclosure relates to a logistics system, a logistics management method, and a computer-readable medium that stores a logistics management program.

2. Description of Related Art

Logistics systems used to deliver an item to a recipient using an unmanned vehicle (e.g., unmanned aerial vehicle or autonomous guided vehicle) have been in practical use. Japanese Laid-Open Patent Publication No. 2019-131068 discloses an example of a logistics system. To improve the efficiency of delivery by an unmanned vehicle, the logistics system is configured to carry items that are to be delivered to delivery locations and respectively deliver the items to the delivery locations in one-time movement.

As services using the above-described logistics system become more widespread, the number of users of the services is expected to rise. As the number of users of the services rises, the number of items that are carried by an unmanned vehicle is also expected to rise. Thus, a system for carrying items using an unmanned vehicle more efficiently is desired.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A logistics system according to an aspect of the present disclosure includes an energy remaining amount identifying unit configured to obtain or estimate an energy remaining amount of an unmanned vehicle subsequent to delivery of an item to a delivery address, the unmanned vehicle being driven by energy supplied from an energy source, a range setting unit configured to set a pickup possible range according to the energy remaining amount, the pickup possible range being used to select pickup location candidates where the unmanned vehicle is able to pick up an item and return to a station of the unmanned vehicle on a return path, the return path including the delivery address as a start point and including the station as an end point, and a pickup location determining unit configured to determine a pickup location from the pickup location candidates located in the pickup possible range.

A logistics management method according to another aspect of the present disclosure causes one or more computers included in a logistics system to identify an energy remaining amount of an unmanned vehicle subsequent to delivery of an item to a delivery address, the unmanned vehicle being driven by energy supplied from an energy source, set a pickup possible range according to the energy remaining amount, the pickup possible range being used to select pickup location candidates where the unmanned vehicle is able to pick up an item and return to a station of the unmanned vehicle on a return path, the return path including the delivery address as a start point and including the station as an end point, and determine a pickup location from the pickup location candidates located in the pickup possible range.

A computer-readable medium according to a further aspect of the present disclosure stores a logistic management program for causing one or more computers included in a logistics system to identify an energy remaining amount of an unmanned vehicle subsequent to delivery of an item to a delivery address, the unmanned vehicle being driven by energy supplied from an energy source, set a pickup possible range according to the energy remaining amount, the pickup possible range being used to select pickup location candidates where the unmanned vehicle is able to pick up an item and return to a station of the unmanned vehicle on a return path, the return path including the delivery address as a start point and including the station as an end point, and determine a pickup location from the pickup location candidates located in the pickup possible range.

Other features and aspects will be apparent from the following detailed description, the drawings, and the claims.

BRIEF DESCRIPTION OF DRAWINGS

FIG. 2 is a diagram schematically showing the data configuration of user information according to the first embodiment.

FIG. 3 is a diagram schematically showing the data configuration of pickup location information according to the first embodiment.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
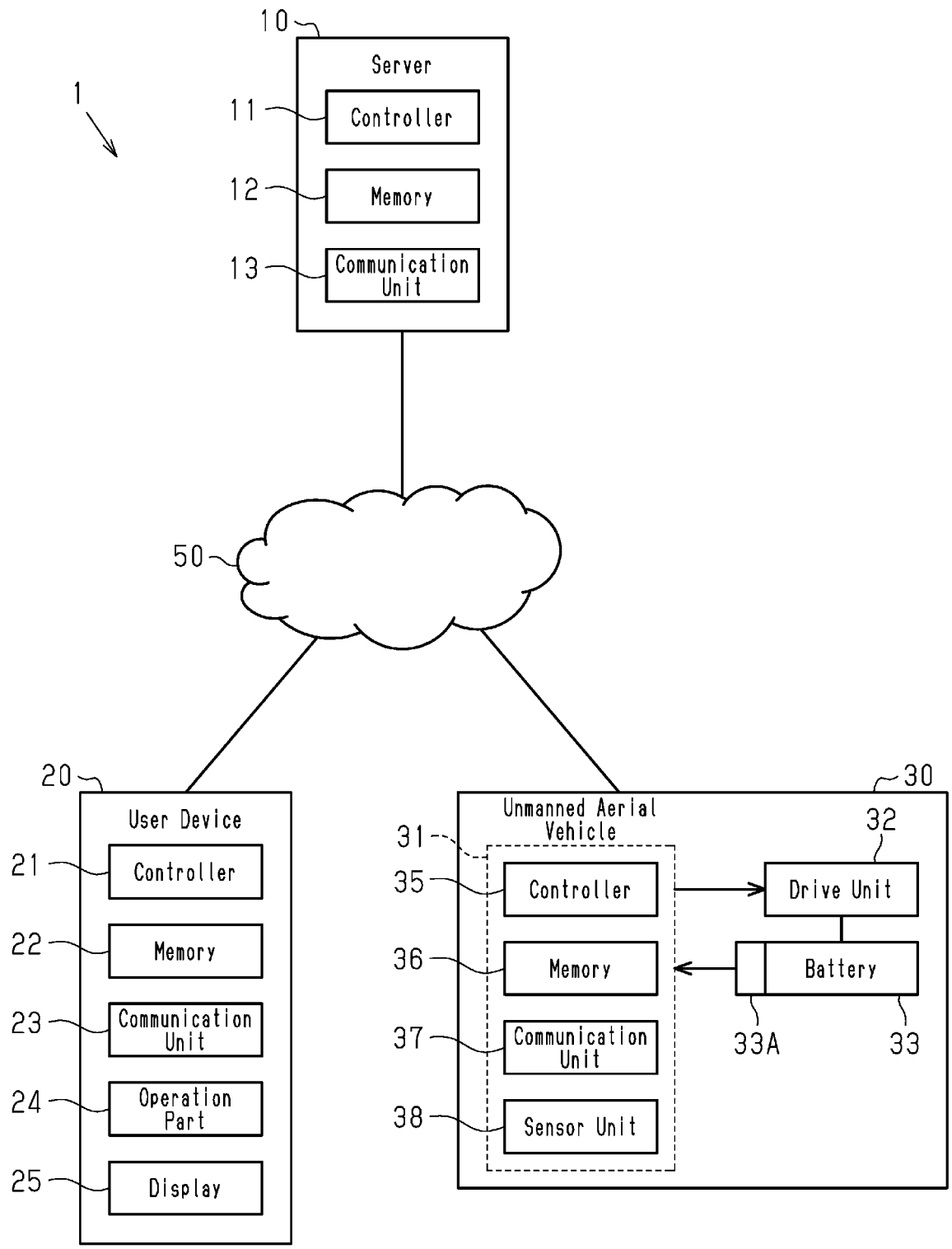
FIG. 1 is a diagram schematically showing the configuration of a logistics system according to a first embodiment.

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

First, the aspects of the present disclosure will be listed and described.

A logistics system according to the present disclosure includes an energy remaining amount identifying unit configured to obtain or estimate an energy remaining amount of an unmanned vehicle subsequent to delivery of an item to a delivery address, the unmanned vehicle being driven by energy supplied from an energy source, a range setting unit configured to set a pickup possible range according to the energy remaining amount, the pickup possible range being used to select pickup location candidates where the unmanned vehicle is able to pick up an item and return to a station of the unmanned vehicle on a return path, the return path including the delivery address as a start point and including the station as an end point, and a pickup location determining unit configured to determine a pickup location from the pickup location candidates located in the pickup possible range.

In such a configuration, on a return path subsequent to delivery, the unmanned vehicle picks up an item from a pickup location selected from the pickup possible range. The pickup possible range is set based on the delivery address and the remaining capacity of the battery. This allows the unmanned vehicle to pick up the item without being supplied with electric power halfway on the return path. Accordingly, items are carried efficiently.

In is preferred that the above-described logistics system further include a notification sending unit configured to detect the pickup location candidates located in the pickup possible range and send a pickup possible notification to a user device corresponding to each of the detected pickup location candidates, the pickup possible notification indicating that an item is capable of being picked up, and a request receiving unit configured to receive, from the user devices, pickup requests for the pickup possible notifications. It is preferred that the pickup location determining unit be configured to determine a pickup location from the pickup location candidates associated with the pickup requests.

In such a configuration, each recommendation notification is sent to the corresponding pickup location candidate located in the pickup possible range. Then, the pickup location is determined from the pickup requests sent to the recommendation notifications. Thus, at the point in time when the unmanned vehicle moves on the return path, a user ready for a pickup is properly selected.

In the above-described logistics system, it is preferred that the energy remaining amount identifying unit be configured to estimate an energy remaining amount of the unmanned vehicle subsequent to movement to the pickup location every time the pickup location determining unit determines the pickup location, and determine whether the energy remaining amount allows for a subsequent pickup and repeat a process that determines the pickup location from the pickup location candidates only when the energy remaining amount allows for the subsequent pickup.

In such a configuration, in a case where the remaining capacity of the battery allows for a pickup, the pickup location is determined from pickup location candidates within the pickup possible range. Accordingly, items are carried efficiently by utilizing the electric power supplied from the battery.

It is preferred that the above-described logistics system further include a weight updating unit configured to subtract, from a pickup possible weight for the unmanned vehicle, a weight of an item to be picked up at the pickup location and update the pickup possible weight every time the pickup location is determined. It is preferred that the pickup location determining unit be configured to determine, as a new pickup location, one or more of the pickup location candidates where a weight of an item subject to a pickup is less than or equal to the pickup possible weight when determining the new pickup location from the pickup location candidates.

Such a configuration subtracts, from the most recent pickup possible weight, the weight of an item that is determined to be picked up and updates the pickup possible weight. Thus, every time the pickup location is determined, this configuration estimates how much power remains in the unmanned vehicle to carry items. Accordingly, the server is able to quickly make a pickup schedule.

It is preferred that the above-described logistics system further include a first fee setting unit configured to set, when there are a number of pickups on the return path, a lower pickup fee for a pickup having a later order among the pickups.

In such a configuration, the fee is set to be lower as the pickup order on the return path becomes later and the restriction on the pickup possible weight becomes tighter. This prompts users to request a pickup.

It is preferred that the above-described logistics system further include a volume updating unit configured to subtract, from a pickup possible volume for the unmanned vehicle, a volume of an item to be picked up at the pickup location and update the pickup possible volume every time the pickup location is determined. It is preferred that the pickup location determining unit be configured to determine, as a new pickup location, one or more of the pickup location candidates where a volume of an item subject to a pickup is less than or equal to the pickup possible volume when determining the new pickup location from the pickup location candidates.

Such a configuration updates the pickup possible volume by subtracting, from the pickup possible volume, the volume of an item that is to be picked up. When determining a new pickup location, such a configuration determines, as the pickup location, a pickup location candidate in which the volume of the item subject to a pickup is less than or equal to the pickup possible volume. This allows the server to estimate how much power remains in the unmanned vehicle to carry items. Accordingly, a pickup schedule is quickly made.

It is preferred that the above-described logistics system further include a second fee setting unit configured to set a pickup fee in a case of requesting a pickup on the return path of the unmanned vehicle to be lower than a pickup fee in a case where the unmanned vehicle in an unloaded state moves from the station to a pickup location, pick up an item at the pickup location, and return to the station.

In such a configuration, the pickup fee in the case of picking up an item on the return path subsequent to the delivery is lower than the pickup fee in the case of traveling between the station and the pickup location only for a pickup. This increases the advantage that a user requests a pickup on the return path.

In the above-described logistics system, it is preferred that each of the pickup possible notifications include a weight of an item capable of being picked up and that the weight of the item capable of being picked up included in the pickup possible notification be set to be larger as a relative distance from the delivery address or a most recent pickup location to one of the pickup location candidates becomes longer, the most recent pickup location being a waypoint.

In such a configuration, the weight of an item capable of being picked up is set to be smaller for a pickup location candidate having a longer relative distance from the delivery address or the most recent pickup location. This minimizes the amount of energy consumed by the unmanned vehicle for a pickup. Accordingly, the number of pickups on the return path is increased.

In the above-described logistics system, it is preferred that each of the pickup possible notifications include a weight of an item capable of being picked up and that the weight of the item capable of being picked up included in the pickup possible notification be set to be larger as a relative distance from a route that connects the station to the delivery address or a most recent pickup location by a shortest distance becomes shorter, the most recent pickup location being a waypoint.

In such a configuration, the weight of an item capable of being picked up is set to be larger for a pickup location candidate having a longer relative distance relative to the shortest movement path from the delivery address or the most recent pickup location to the station. This minimizes the amount of energy consumed by the unmanned vehicle for a pickup. Accordingly, the number of pickups on the return path is increased.

It is preferred that the above-described logistics system further include a request registering unit configured to receive, from one or more user devices, one or more pieces of request information including a pickup address, a delivery address, a weight of an item, and a volume of the item and store the one or more pieces of request information in a memory as pickup location information. It is preferred that the pickup location determining unit be configured to search for the pickup location information, detect one or more pieces of request information indicating that the pickup address is included in the pickup possible range, the weight of the item is less than or equal to a pickup possible weight for the unmanned vehicle, and the volume of the item is less than or equal to a pickup possible volume for the unmanned vehicle, and determine, as a pickup location, one of the detected one or more pieces of the request information.

Such a configuration uses request information including the pickup address, the delivery address, the weight of an item, and the volume of the item to search for the pickup location information that satisfies the pickup condition. Thus, as compared with when a pickup possible notification is sent, the pickup location is immediately determined.

A logistics management method according to the present disclosure causes one or more computers included in a logistics system to execute an energy remaining amount identifying step that identifies an energy remaining amount of an unmanned vehicle subsequent to delivery of an item to a delivery address, the unmanned vehicle being driven by energy supplied from an energy source, a range setting step that sets a pickup possible range according to the energy remaining amount, the pickup possible range being used to select pickup location candidates where the unmanned vehicle is able to pick up an item and return to a station of the unmanned vehicle on a return path, the return path including the delivery address as a start point and including the station as an end point, and a pickup location determining step that determines a pickup location from the pickup location candidates located in the pickup possible range.

A computer-readable medium according to the present disclosure stores a logistic management program for causing one or more computers included in a logistics system to identify an energy remaining amount of an unmanned vehicle subsequent to delivery of an item to a delivery address, the unmanned vehicle being driven by energy supplied from an energy source, set a pickup possible range according to the energy remaining amount, the pickup possible range being used to select pickup location candidates where the unmanned vehicle is able to pick up an item and return to a station of the unmanned vehicle on a return path, the return path including the delivery address as a start point and including the station as an end point, and determine a pickup location from the pickup location candidates located in the pickup possible range.

First Embodiment

A logistics system 1, a logistics management method, and a computer-readable medium that stores a logistics management program according to a first embodiment will now be described. In the logistics system 1 according to the first embodiment, an unmanned aerial vehicle is used as an unmanned vehicle.

Configuration of Logistics System

As shown in FIG. 1, the logistics system 1 includes a server 10, a user device 20, and the unmanned aerial vehicle 30. The logistics system 1 is used to deliver an item to the delivery address of a recipient and pick up an item from a pickup address. A route from a station to the delivery address is referred to as an outbound path. A route from the delivery address to the station via a pickup address is referred to as a return path. The logistics system 1 determines a pickup address on the return path based on the remaining amount of energy in the unmanned aerial vehicle 30.

The server 10 is managed by a logistics manager and includes one or more information processing devices. The server 10 includes a controller 11, a memory 12, and a communication unit 13. The controller 11 includes an arithmetic logic unit and a memory (memory medium). The arithmetic logic unit loads, for example, an operating system and various programs (e.g., logistics management program) into the memory of the controller 11 from the memory 12 or a storage, and executes instructions retrieved from the memory of the controller 11. The arithmetic logic unit is circuitry (e.g., CPU). The memory 12 is an auxiliary storage device (memory medium) and includes various types of information used to manage logistics. The communication unit 13 is implemented as hardware, software, or a combination thereof. The communication unit 13 sends and receives data to and from the user device 20 and the unmanned aerial vehicle 30 via a network 50. The server 10 may include an operation part or a display for which a logistics manager or the like performs an input operation.

The user device 20 is an information processing device used by a user who uses the logistics system 1. The user device 20 is a smartphone (multi-functional telephone terminal), a tablet terminal, a personal computer, a wearable computer, or another information processing device capable of displaying images.

The user device 20 includes a controller 21, a memory 22, a communication unit 23, an operation part 24, and a display 25. The controller 21 includes an arithmetic logic unit and a memory. The arithmetic logic unit loads, for example, an operating system and programs related to delivery and pickup into the memory of the controller 21 from the memory 22 or a storage, and executes instructions retrieved from the memory of the controller 21. The arithmetic logic unit is processing circuitry such as a central processing unit (CPU), a graphic processing unit (GPU), or a neural network processing unit (NPU). The memory 22 is an auxiliary memory device (memory medium) and stores various types of information related to user. The memory 22 may implement a program capable of receiving a notification related to delivery and pickup. This program may be a dedicated program for receiving the offer of delivery and pickup services or may be a program using a social networking service. Alternatively, the program may be an email software capable of receiving a notification email. The communication unit 23 is implemented as hardware, software, or a combination thereof. The communication unit 23 sends and receives data to and from the server 10 via the network 50. The operation part 24 is a touch panel integrated with the display 25. Alternatively, the operation part 24 is, for example, an operation button, a keyboard, a mouse, or a controller on a housing or the like of the user device 20. The display 25 outputs various types of images according to an output instruction of the controller 21.

The unmanned aerial vehicle 30 is an aerial vehicle without a person onboard, and is a device managed by a logistics manager or the owner of the unmanned aerial vehicle 30. The unmanned aerial vehicle 30 includes a control device 31, a drive unit 32, and a battery 33 (energy source). The control device 31 controls the drive unit 32. The drive unit 32 includes, for example, a drive source that is driven by electric power supplied from the battery 33 or a rotary wing that is operated by power obtained from the drive source. In the present embodiment, the drive source is an electric motor. The drive unit 32 may be an engine that is driven by consuming fuel. In this case, instead of the battery 33, a fuel supplying unit that supplies the drive unit 32 with fuel is disposed as the energy source. The unmanned aerial vehicle 30 may include a hybrid-type drive unit 32 equipped with various types of drive sources.

The control device 31 includes a controller 35, a memory 36, a communication unit 37, and a sensor unit 38. The controller 35 has almost the same configuration as the controller 11 of the server 10 or the controller 21 of the user device 20. The memory 36 has almost the same configuration as the memory 12 of the server 10 or the memory 22 of the user device 20. In addition to a program for autonomous flying, the memory 36 may store various types of information (e.g., map information and delivery address). The sensor unit 38 includes a global positioning system (GPS) sensor that detects a current position. The sensor unit 38 may include at least one of an image sensor (camera), a sensor that detects wind direction and wind speed, an acceleration sensor, a gyro sensor, an infrared sensor, a geomagnetic sensor, an altitude sensor, a displacement sensor, and a temperature sensor. The unmanned aerial vehicle 30 may include a microphone or a speaker.

The controller 35 obtains the remaining capacity of the battery 33 from a remaining capacity detection circuit 33A in the battery 33. The remaining capacity detection circuit 33A of the battery 33 detects the remaining capacity of the battery 33 and outputs it to the control device 31. The remaining capacity of the battery 33 is, for example, the state of charge (SOC) of the battery 33. When the battery 33 is fully charged, the SOC of the battery 33 is 100%. Alternatively, the remaining capacity detection circuit 33A may measure the voltage at the battery 33 and output the remaining discharge capacity (Ah) to the controller 35. The control device 31 obtains remaining capacity information from the remaining capacity detection circuit 33A and sends it to the server 10 via the communication unit 37.

FIGS. 2 and 3 show the overview of the data configuration of user information 15 and pickup location information 16 stored in the memory 12 of the server 10, respectively. As shown in FIG. 2, the user information 15 includes a user ID, address, and notification information. The user ID is identification information assigned to each user. The address indicates a place where a user receives or leaves an item. The notification information is used for a user to receive, for example, a pickup-related notification or various types of information. For example, when a user receives a push notification via an application program implemented in the user device 20, the notification information includes a registered ID, a device token, and the like associated with the user device 20. Alternatively, when a user receives a notification via email, the notification information includes the user's email address.

As shown in FIG. 3, the pickup location information 16 indicates the content of the pickup and is based on information transmitted from the user device 20 or the like. The content of the pickup is registered for each item subject to the pickup. The pickup location information 16 includes the user ID of a user who requested the pickup, a pickup address (the address of a pickup location), a delivery address to which the picked-up item is delivered, item detail, a pickup fee, and a pickup status. The pickup address is registered based on, for example, the address of user information. The item detail indicates the weight and volume of a picked-up item. In the present disclosure, the volume of an item (baggage) to be picked up indicates the total value of the maximum dimensions of the width, depth, and height (e.g., in centimeters) of that item. The pickup fee is registered at the point in time when the fee is determined, such as when the item is picked up at a station 51. The pickup status indicates the status of pickup of an item. The pickup status is set to any one of "Waiting for Pickup," "Being Picked Up," and "Pickup Completed". In addition, the pickup location information 16 may include the date and time at which the user requests that the item be picked up.

Pickup service offered by the logistics system 1 includes a first pickup method and a second pickup method. In the first pickup method, the unmanned aerial vehicle 30 in an unloaded state moves from a station to a pickup address and picks up an item at the pickup address. In the second pickup method, the unmanned aerial vehicle 30 picks up an item on a return path after delivering an item. In the second pickup method, the point in time of delivery is flexibly determined according to the delivery status. Thus, the use of the second pickup method allows for more efficient pickup in terms of time and energy consumption amount than the use of the first pickup method. Accordingly, the fee of pickup is set to be lower in the second pickup method than in the first pickup method when the same pickup conditions are used other than the pickup method. Of the first and second pickup methods, the pickup location information 16 may include one that the user wishes to use.

Overview of Pickup Location Determining Process

The overview of a pickup process executed by the logistics system 1 will now be described with reference to FIGS. 4 and 5. The logistics system 1 functions as an energy remaining amount identifying unit, a range setting unit, a pickup location determining unit, a notification sending unit, a request receiving unit, a weight updating unit, a volume updating unit, a first fee setting unit, and a second fee setting unit. In the present embodiment, these functions are enabled by the server 10.

Figure 4:
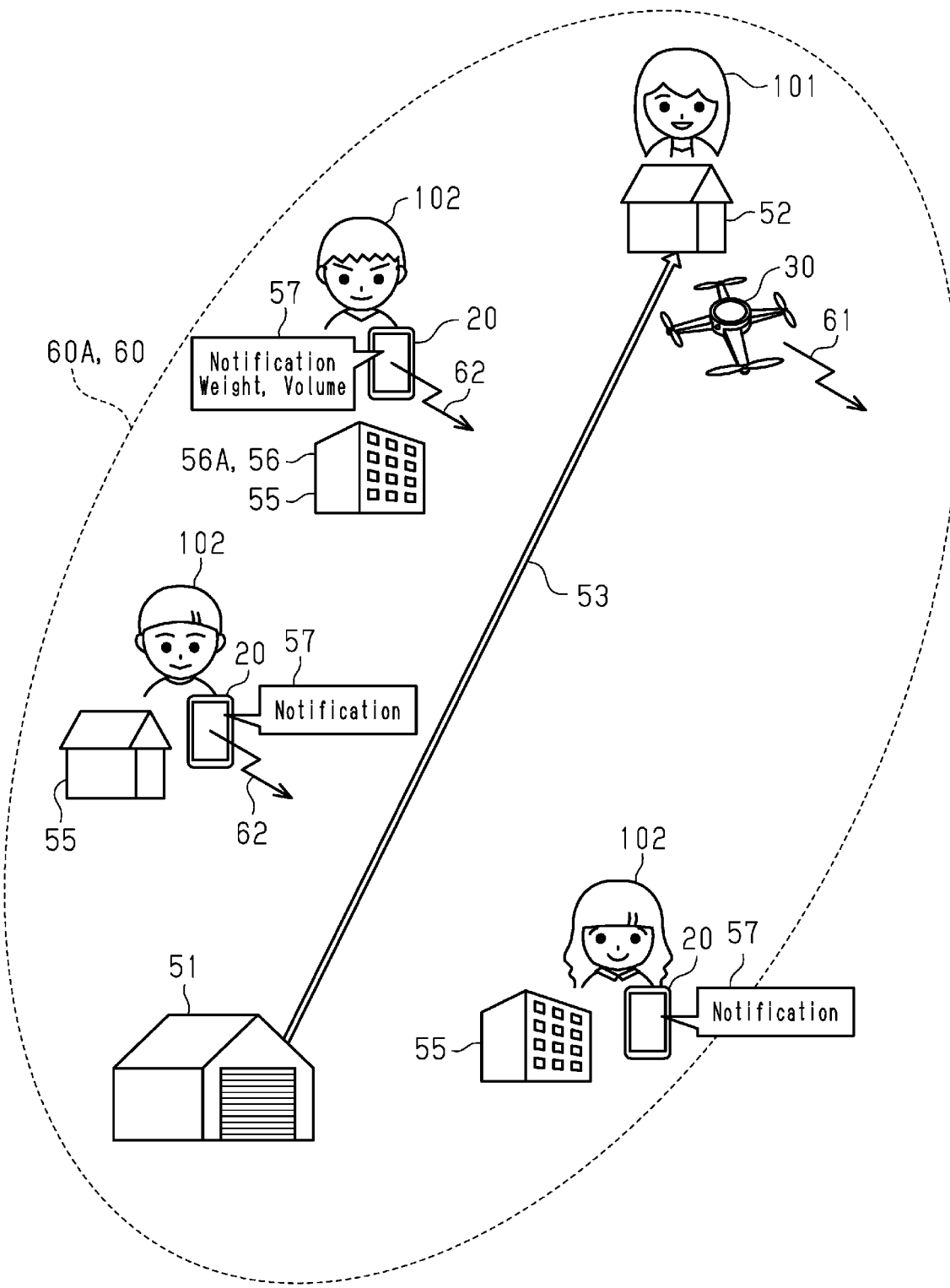
FIG. 4 is a diagram schematically illustrating a procedure for determining a first-time pickup location according to the first embodiment.

As shown in FIG. 4, the unmanned aerial vehicle 30 delivers an item by moving from the station 51 to a delivery address 52 on an outbound path 53. The delivery address 52 is the address of a user 101, who is a recipient. Examples of the station 51 include a warehouse or store where items that are to be delivered and items that have been picked up are temporarily collected, and a delivery vehicle that is parked near the delivery address 52. In FIGS. 4 and 5, the station 51 serving as the start point of the outbound path 53 is the same as the station 51 serving as the end point of the return path. Instead, these stations 51 may be different from each other.

The server 10 accepts a request from one of users 102 who requests that his or her item be picked up, and stores the request as the pickup location information 16 in advance. The server 10 uses the pickup location information 16 to select a pickup location 56 that serves as a waypoint. The server 10 sends the address of the selected pickup location 56 to the unmanned aerial vehicle 30. When receiving the address of the pickup location 56 from the server 10, the unmanned aerial vehicle 30 picks up the item via the pickup location 56 on the return path to the station 51.

The functions enabled by the logistics system 1 will now be described.

Energy Remaining Amount Identifying Unit

The energy remaining amount identifying unit obtains the remaining capacity of the battery 33 of the unmanned aerial vehicle 30 when the unmanned aerial vehicle 30 delivers an item to the delivery address 52. The unmanned aerial vehicle 30 sends, to the server 10, remaining capacity information 61 that indicates the remaining capacity of the battery 33 at a predetermined interval. The point in time when an item is delivered includes a point in time immediately before the unmanned aerial vehicle 30 reaches the delivery address 52, the point in time when the unmanned aerial vehicle 30 reaches the delivery address 52, or the point in time when the item is unloaded from the unmanned aerial vehicle 30 and the unmanned aerial vehicle 30 departs from the delivery address 52.

Figure 5:
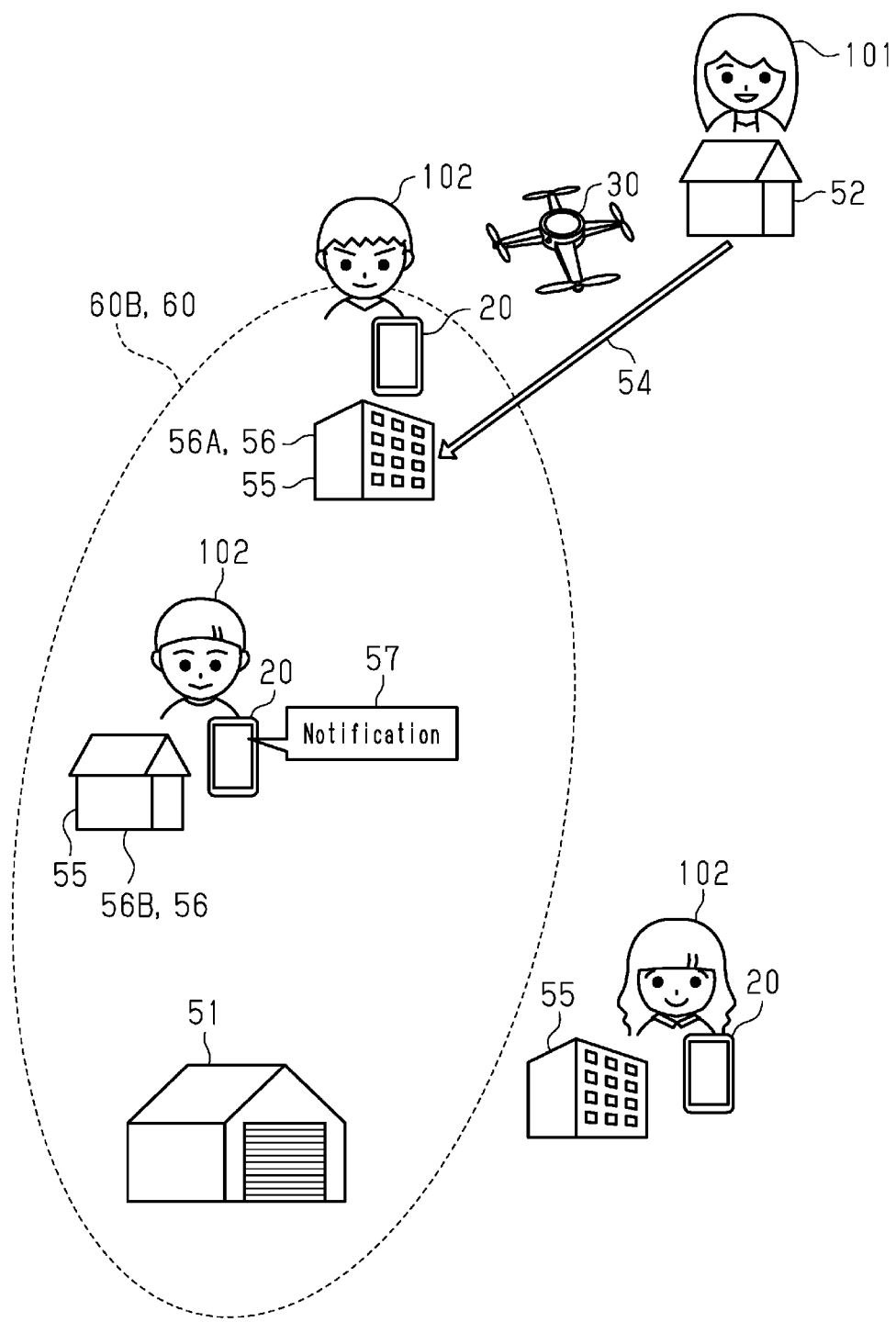
FIG. 5 is a diagram schematically illustrating a procedure for determining a second-time pickup location according to the first embodiment.

As shown in FIG. 5, the energy remaining amount identifying unit refers to the movement distance on a pickup route 54 and a load weight of the unmanned aerial vehicle 30 to estimate the remaining capacity of the battery 33 of the unmanned aerial vehicle 30 when an item is picked up from a pickup address. The point in time when an item is picked up from the pickup address includes a point in time immediately before the unmanned aerial vehicle 30 reaches the pickup location 56, the point in time when the unmanned aerial vehicle 30 reaches the pickup location 56, or the point in time when the unmanned aerial vehicle 30 picks up the item and departs from the pickup location 56. The pickup route 54 shown in FIG. 5 is a route where the unmanned aerial vehicle 30 moves from the delivery address 52 to a first-time pickup location 56A. The energy remaining amount identifying unit may refer to the movement distance and the load weight of the unmanned aerial vehicle 30 to estimate the remaining capacity of the battery 33 using a table or map that has been stored in advance. Alternatively, the energy remaining amount identifying unit may calculate the remaining capacity of the battery 33 using a computational expression. The longer the movement distance, the lower the remaining capacity of the battery 33. The heavier the load weight, the lower the remaining capacity of the battery 33.

Range Setting Unit

The range setting unit sets a pickup possible range 60 that is used to determine a pickup location. Based on the longest flyable range determined by the remaining capacity of the battery 33 and the load weight, the range setting unit sets the pickup possible range 60.

FIG. 4 shows a pickup possible range 60A that is used to determine a first-time pickup location 56. Based on the delivery address 52 and the remaining capacity of the battery 33 at the delivery address 52, the range setting unit sets the pickup possible range 60A. When a pickup address is within the pickup possible range 60A, the unmanned aerial vehicle 30 can return to the station 51 from the delivery address 52 via the pickup address. The pickup possible range 60A set for a first-time pickup includes the delivery address 52 and the position of the station 51. Alternatively, the pickup possible range 60A set for a first-time pickup may include one of the delivery address 52 and the position of the station 51, or may be set between a first-time delivery address 52 and the station 51. The larger the remaining capacity of the battery 33, the broader the pickup possible range 60A. The smaller the remaining capacity of the battery 33, the narrower the pickup possible range 60A.

The pickup possible range 60A may have, for example, an oval shape of which the foci are the station 51 and the delivery address 52. Each position on the outer edge of the pickup possible range 60A is set such that the sum of distances from the two foci is fixed. That is, the distance to the station 51 from the delivery address 52 via that position is fixed. Alternatively, the pickup possible range 60A may have, for example, a circular or rectangular shape that includes the station 51 and the delivery address 52.

FIG. 5 shows a second-time pickup location 56 that is used to determine a pickup possible range 60B. Based on the address of the first-time pickup location 56A and the remaining capacity of the battery 33 at the pickup location 56A, the range setting unit sets the pickup possible range 60B. When a pickup address is within the pickup possible range 60B, the unmanned aerial vehicle 30 can return to the station 51 from the first-time pickup location 56A via the second-time pickup location 56B. The second-time pickup possible range 60B is narrower than the first-time pickup possible range 60A. For example, the pickup possible range 60B is set in a range that includes the first-time pickup location 56A and the position of the station 51. When determining the third-time and subsequent pickup locations 56, the range setting unit sets pickup possible ranges 60 in the same manner as when determining the second-time pickup location 56.

Weight Updating Unit

Every time a pickup location 56 is determined, the weight updating unit subtracts the weight of an item that is to be picked up at the pickup location 56 from a pickup possible weight for the unmanned aerial vehicle 30 and updates the pickup possible weight. For example, the maximum load weight of the unmanned aerial vehicle 30 may be set to a pickup possible weight G1 before the unmanned aerial vehicle 30 starts pickup. The weight updating unit calculates a pickup possible weight G2 in a second-time pickup by subtracting the weight of an item that is to be left by a first-time pickup from the pickup possible weight G1.

Volume Updating Unit

Every time a pickup location 56 is determined, the volume updating unit subtracts the volume of an item that is to be picked up at the pickup location 56 from a pickup possible volume for the unmanned aerial vehicle 30 and updates the pickup possible volume. For example, the maximum load volume of the unmanned aerial vehicle 30 may be set to a pickup possible volume C1 before the unmanned aerial vehicle 30 starts pickup. The volume updating unit calculates a pickup possible volume C2 in a second-time pickup by subtracting the weight of an item that is to be left by a first-time pickup from the pickup possible volume C1.

Notification Sending Unit

The notification sending unit refers to the pickup location information 16 to detect a pickup location candidate 55 in which the pickup address is within the pickup possible range 60 and the pickup status is "Waiting for Pickup". The notification sending unit sends a recommendation notification 57 to the user device 20 corresponding to the detected pickup location candidate 55. The recommendation notification 57 is a pickup possible notification indicating that the unmanned aerial vehicle 30 is capable of picking up an item.

As shown in FIG. 4, when determining a first-time pickup location 56, the notification sending unit refers to the pickup location information 16 to search for the pickup address included in the pickup possible range 60A. The notification sending unit creates a recommendation notification including the pickup possible weight G1 and the pickup possible volume C1, which indicate a first-time pickup condition. When detecting the pickup address, the notification sending unit regards the pickup address as the pickup location candidate 55 and sends the recommendation notification 57 to notification information of the user 102 corresponding to the detected pickup address. The recommendation notification 57 may include an estimated time at which an item will be picked up. A notification indicating that an item cannot be picked up may be sent to the user device 20 corresponding to a pickup address that is not included in the pickup possible range 60A.

As shown in FIG. 5, when determining the second-time and subsequent locations 56, the notification sending unit detects a pickup location candidate 55 included in the pickup possible range 60B in the same manner as when determining the first-time pickup location 56A. Then, the notification sending unit sends the recommendation notification 57 to the detected pickup location candidate 55.

Request Receiving Unit

The request receiving unit receives, from each user device 20, a pickup request for the corresponding recommendation notification 57. The pickup request is information that indicates each user 102 requests that his or her item be picked up when the corresponding recommendation notification 57 is received.

As shown in FIG. 4, each user device 20 receives the corresponding recommendation notification 57. Each user 102 checks the pickup possible weight G1 and pickup possible volume C1 included in the corresponding recommendation notification 57. When requesting that his or her item be picked up, the user 102 operates the user device 20 to send a pickup request 62 to the server 10. The pickup request 62 includes information that can be used to identify the user 102 (e.g., user ID). Thus, the pickup request 62 is linked to the pickup location information 16 based on the identification information. In the present embodiment, the pickup request 62 includes the weight and volume of an item subject to a pickup. The user device 20 may send the pickup request 62 including the delivery address. In such a manner, the server 10 receives each pickup request 62 for the corresponding recommendation notification 57. This allows for identification of a user who is ready for a pickup in a time period during which the unmanned aerial vehicle 30 visits for a pickup.

Pickup Location Determining Unit

The pickup location determining unit determines a pickup location 56 that satisfies a pickup condition from pickup location candidates 55. The pickup condition includes a condition in which a pickup address is included in the pickup possible range 60 and a condition in which the weight of an item subject to a pickup is less than or equal to the pickup possible weight and the volume of that item is less than or equal to the pickup possible volume.

As shown in FIG. 4, in the case of determining a first-time pickup location 56, the pickup location determining unit sorts the pickup requests 62 received by the request receiving unit on a first-come-first-served basis. Further, the pickup location determining unit determines whether the weight of an item included in a pickup request is less than or equal to the pickup possible weight G1 and the volume of that item is less than or equal to the pickup possible volume C1. The pickup location determining unit determines, as the first-time pickup location 56A, the pickup address corresponding to the earliest-accepted one of the pickup requests 62 in which the weight of the item has been determined as being less than or equal to the pickup possible weight G1 and the volume of the item has been determined as being less than or equal to the pickup possible volume C1.

When determining the first-time pickup location 56A, the pickup location determining unit sends a pickup notification to the user device 20 corresponding to the pickup location 56A. Further, the pickup location determining unit sends, to the unmanned aerial vehicle 30, the address of the pickup location 56A and an instruction of movement to the pickup location 56A. When receiving these pieces of information, the unmanned aerial vehicle 30 uses map information or the like to determine its movement direction while comparing its current position with the first-time pickup location 56A. Then, the unmanned aerial vehicle 30 starts autonomously flying to the pickup location 56A.

As shown in FIG. 5, in the case of determining a second-time pickup location 56, the pickup location determining unit determines whether the weight of an item included in a pickup request received by the request receiving unit is less than or equal to the pickup possible weight G2 and the volume of that item is less than or equal to the pickup possible volume C2. The pickup location determining unit determines, as the second-time pickup location 56B, the pickup address corresponding to the earliest-accepted one of the pickup requests 62 in which the weight of the item has been determined as being less than or equal to the pickup possible weight G2 and the volume of the item has been determined as being less than or equal to the pickup possible volume C2. Subsequently, the pickup location determining unit repeats the above-described processes until one of the following conditions is satisfied; namely, a condition in which the remaining capacity of the battery 33 reaches an amount at which the unmanned aerial vehicle 30 is no longer able to pick up an item, a condition in which the load weight or load volume reaches its upper limit value, or a condition in which there is no longer a pickup request that satisfies a pickup possible weight and a pickup possible volume.

First Fee Setting Unit

The first fee setting unit determines a fee by referring to a fee table that includes, for example, a discount rate. When there are a number of pickups on the return path, the first fee setting unit sets a lower fee for a pickup having a later order among the pickups. This fee includes a pickup fee and a delivery fee. When setting a fee, for example, the first fee setting unit applies a larger discount rate as the order of the pickup becomes later.

Second Fee Setting Unit

The second fee setting unit sets a fee in the case of using the second fee setting unit to be lower than a fee in the case of using the first pickup method. That is, the second fee setting unit sets a fee in the case of requesting a pickup on the return path of the unmanned aerial vehicle 30 to be lower than a pickup fee in a case where the unmanned aerial vehicle 30 in an unloaded state moves from the station 51 to a pickup location 56, picks up an item at the pickup location 56, and returns to the station 51.

Procedure of Pickup Location Determining Process

Figure 6:
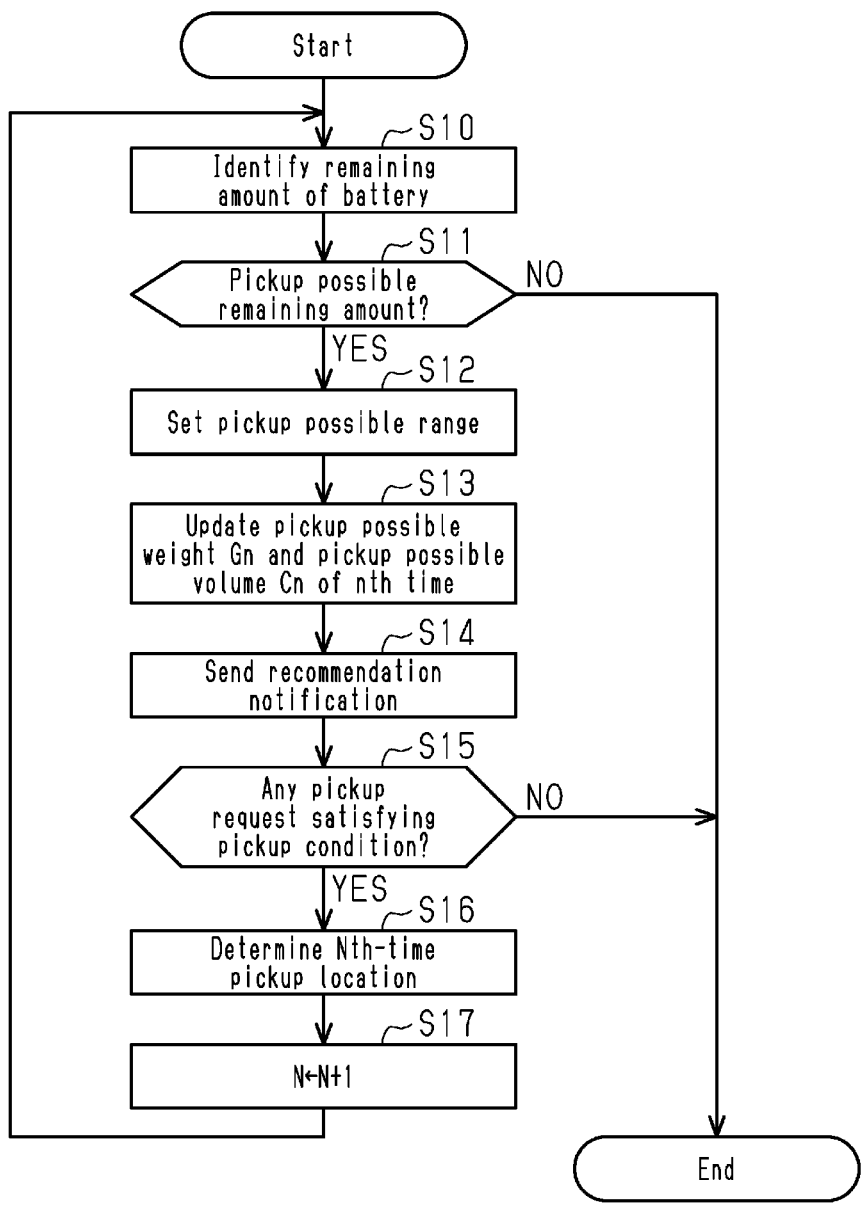
FIG. 6 is a flowchart illustrating a procedure for determining a pickup location according to the first embodiment.

A procedure for determining a pickup location in the present embodiment will now be described with reference to FIG. 6. In the present embodiment, this procedure is executed by the server 10.

First, a process that determines a first-time pickup location will be described. The server 10 identifies the remaining capacity of the battery 33 in a state where the delivery of an item to the delivery address 52 by the unmanned aerial vehicle 30 is completed (step S10). In this step, the server 10 identifies the remaining capacity by obtaining the remaining capacity information 61 that has been sent from the unmanned aerial vehicle 30.

Next, the server 10 determines whether the remaining capacity of the battery 33 obtained in step S10 allows for a first-time pickup (step S11). In this step, the server 10 estimates the remaining capacity of the battery 33 that is needed for movement from the delivery address 52 to the station 51 (e.g., 30%). When the estimated remaining capacity of the battery 33 is greater than or equal to a predetermined value, the server 10 determines that the capacity allows for a first-time pickup. The predetermined value is obtained by adding a predetermined remaining capacity (e.g., 10%) to the remaining capacity needed for the unmanned aerial vehicle 30 to return to the station 51 (e.g., 30%). For instance, the predetermined value is greater than or equal to 40% (30%+10%). When determining that the remaining capacity of the battery 33 does not allow for a first-time pickup (step S11: NO), the server 10 sends, to the unmanned aerial vehicle 30, an instruction to return to the station 51. Then, the server 10 ends the pickup process.

When determining that the remaining capacity of the battery 33 allows for a first-time pickup (step S11: YES), the server 10 sets the pickup possible range 60A of the unmanned aerial vehicle 30 based on the delivery address 52 and the obtained remaining capacity of the battery 33 (step S12).

Then, the server 10 updates the pickup possible weight G1 and pickup possible volume C1 for a first-time pickup (step S13). For the first-time pickup, the server 10 may set each of the pickup possible weight G1 and the pickup possible volume C1 to an initial value. By executing steps S12, S13, the server 10 sets a pickup condition for the first-time pickup.

The server 10 sends the recommendation notification 57 to a pickup location candidate 55 that is within the pickup possible range 60A (step S14). In this step, the server 10 refers to the pickup location information 16 to detect a pickup address of which the pickup status is "Waiting for Pickup" and which is included in the pickup possible range 60A. The server 10 sends the recommendation notification 57 including the pickup possible weight G1 and the pickup possible volume C1 to the user device 20 corresponding to the detected pickup location information 16.

Subsequently, the server 10 determines whether there are pickup requests that satisfy the first-time pickup condition (step S15). In this step, the server 10 receives a pickup request 62 for the recommendation notification 57. The pickup request 62 has been sent from the user device 20 corresponding to the pickup location candidate 55 in the pickup possible range 60A. Thus, the server 10 determines whether the pickup condition is satisfied by determining whether the weight included in the pickup request 62 is less than or equal to the pickup possible weight G1 and the volume included in the pickup request 62 is less than or equal to the pickup possible volume C1.

When determining that there is no pickup request 62 that satisfies the first-time pickup condition (step S15: NO), the server 10 sends, to the unmanned aerial vehicle 30, an instruction to return to the station 51. Then, the server 10 ends the pickup process.

When determining that there are pickup requests 62 that satisfy the first-time pickup condition (step S15: YES), the server 10 determines a first-time pickup location from pickup location candidates 55 corresponding to the pickup requests 62 that satisfy the first-time pickup condition (step S16). The server 10 refers to the pickup location information 16 to determine a first-time pickup location 56A on a first-come-first-served basis from the pickup requests 62 that satisfy the first-time pickup condition. Then, the server 10 sends a pickup notification to the user device 20 corresponding to the first-time pickup location 56A.

After determining the first-time pickup location 56A, the server 10 increments the number of pickups N (step S17) in order to execute a process for a second-time pickup location. Then, the server 10 returns to step S10.

A process that determines the second-time pickup location is executed during, for example, a period in which the unmanned aerial vehicle 30 moves from the delivery address 52 to the first-time pickup location 56A. In step S10, the server 10 refers to the movement distance on the pickup route 54 from the delivery address 52 to the pickup location 56A to estimate the remaining capacity of the battery 33 at which the unmanned aerial vehicle 30 reaches the first-time pickup location 56A. This allows the server 10 to identify the remaining capacity of the battery 33 based on the estimation.

Next, the server 10 determines whether the remaining capacity of the battery 33 obtained in step S10 allows for a second-time pickup (step S11). When determining that the remaining capacity of the battery 33 does not allow for a second-time pickup (step S11: NO), the server 10 sends, to the unmanned aerial vehicle 30, an instruction to return to the station 51. Then, the server 10 ends the pickup process.

When determining that the remaining capacity of the battery 33 allows for a second-time pickup (step S11: YES), the server 10 sets the pickup possible range 60B of the unmanned aerial vehicle 30 based on the pickup location 56A and the obtained remaining capacity of the battery 33 (step S12).

Then, the server 10 updates the pickup possible weight G2 and pickup possible volume C2 of a second-time pickup based on the pickup possible weight G1 and pickup possible volume C1 of the first time (step S13). By executing steps S12, S13, the server 10 sets a second-time pickup condition.

After setting the second-time pickup condition, the server 10 sends the recommendation notification 57 in the same manner as step S14 of the first time (step S14). Then, the server 10 determines whether there are pickup request 62 that satisfy the second-time pickup condition (step S15). When determining that there is no pickup request 62 that satisfies the second-time pickup condition (step S15: NO), the server 10 sends, to the unmanned aerial vehicle 30, an instruction to return to the station 51. Then, the server 10 ends the pickup process.

When determining that there are pickup requests 62 that satisfy the second-time pickup condition (step S15: YES), the server 10 determines a second-time pickup location from pickup location candidates 55 corresponding to the pickup requests 62 that satisfy the second-time pickup condition (step S16). The server 10 refers to the pickup location information 16 to determine the second-time pickup location 56B on a first-come-first-served basis from the pickup requests 62 that satisfy the second-time pickup condition. Then, the server 10 sends a pickup notification to the user device 20 corresponding to the second-time pickup location 56B.

After determining the second-time pickup location 56B, the server 10 increments the number of pickups N (step S17) in order to execute a process a third-time pickup location. Then, the server 10 returns to step S10. That is, the server 10 ends the process when at least one of the following conditions is satisfied; namely, a condition in which the remaining capacity of the battery 33 falls below the remaining capacity estimated to allow for a pickup, a condition in which the load weight and the load volume of an item each reaches its upper limit value, and a condition in which a pickup request that meets a pickup condition is not detected. Then, the server 10 sends, to the unmanned aerial vehicle 30, an instruction to return to the station 51.

Figure 7:
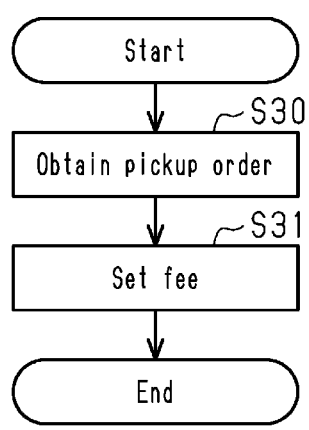
FIG. 7 is a flowchart illustrating a procedure for setting a fee according to the first embodiment.

A process that determines a pickup fee will now be described with reference to FIG. 7.

The process that determines a pickup fee is executed at a predetermined point in time (e.g., after the unmanned aerial vehicle 30 reaches the station 51). The server 10 obtains a pickup order on the return path for each pickup request (step S30). Further, the server 10 sets a pickup fee according to the pickup order (step S31). For example, for a pickup request in which an item has been picked up at the first time during movement on the return path, the server 10 refers to a fee table or the like to determine the fee based on the weight and volume of the item. In this case, the server 10 sets the fee in the second pickup method, which is lower than the fee in the first pickup method (normal pickup). For a pickup request in which an item has been picked up at the second time, the server 10 sets a fee obtained by applying a predetermined discount rate (e.g., 5%) to the pickup fee in the second pickup method corresponding to the delivery address, the weight of the item, and the volume of the item. For a pickup request in which an item has been picked up at the third time, the server 10 sets a fee obtained by applying a predetermined discount rate (e.g., 10%) to the pickup fee in the second pickup method corresponding to the delivery address, the weight of the item, and the volume of the item. The discount rate in the third-time pickup is set to be greater than that in the second-time pickup. After determining the pickup fee, the server 10 registers it in the pickup location information 16. Thus, in the process that determines a pickup fee, the pickup fee is set to be lower as the pickup number increases. Instead, the pickup fee may be set to be lower as the pickup number decreases. For example, if a pickup request is sent at an early time in response to the receipt of the recommendation notification 57, the schedule of the pickup progresses promptly. Thus, a user who sent a pickup request at an early time may be given incentives.

The advantages of the first embodiment will now be described.

(1-1) On a return path subsequent to delivery, the unmanned aerial vehicle 30 picks up an item from a pickup location 56 selected from the pickup possible range 60. The pickup possible range 60 is set based on the delivery address 52 and the remaining capacity of the battery 33. This allows the unmanned aerial vehicle 30 to pick up the item without being supplied with electric power halfway on the return path. Thus, the period of time for a pickup is shortened. Further, as compared with delivery in an unloaded state, the power consumption is reduced. Accordingly, items are carried efficiently.

(1-2) Each recommendation notification 57 is sent to the corresponding pickup location candidate 55 located in the pickup possible range 60. Then, the pickup location 56 is determined from the pickup requests sent to the recommendation notifications 57. Thus, at the point in time when the unmanned aerial vehicle 30 moves on the return path, a user ready for a pickup is properly selected.

(1-3) In a case where the remaining capacity of the battery 33 allows for a pickup, the pickup location 56 is determined from pickup location candidates 55 within the pickup possible range 60. Accordingly, items are carried efficiently by utilizing the electric power supplied from the battery 33.

(1-4) The server 10 updates the pickup possible weight Gn by subtracting the weight of an item subject to a pickup from the most recent pickup possible weight G(n−1). When determining a new pickup location 56, the server 10 determines, as the pickup location 56, a pickup location candidate 55 in which the weight of the item subject to a pickup is less than or equal to the pickup possible weight Gn. Thus, every time the pickup location is determined, this configuration allows the server 10 to estimate how much power remains in the unmanned aerial vehicle 30 to carry items. Accordingly, the server 10 is able to quickly make a pickup schedule.

(1-5) The server 10 updates the pickup possible volume Cn by subtracting, from the pickup possible volume Cn, the volume of an item that is to be picked up. When determining a new pickup location 56, the server 10 determines, as the pickup location 56, a pickup location candidate 55 in which the volume of the item subject to a pickup is less than or equal to the pickup possible volume Cn. Thus, every time the pickup location is determined, this configuration allows the server 10 to estimate how much power remains in the unmanned aerial vehicle 30 to carry items. Accordingly, the server 10 is able to quickly make a pickup schedule.

(1-6) The server 10 sets the pickup fee in the case of using the second pickup method, which is employed during a pickup on the return path, to be lower than the pickup fee in the case of using the first pickup method. This increases the advantage that a user requests a pickup on the return path.

(1-7) The larger the pickup number on the return path, the lower the pickup fee at a pickup location 56 is set. Thus, the fee is set to be lower as the pickup number on the return path becomes larger and the restriction on the pickup possible weight becomes tighter. This prompts users 102 to request a pickup.

Second Embodiment

A logistics system 1 according to a second embodiment will now be described. In the first embodiment, each recommendation notification 57 indicating a weight and a volume that allow for a pickup is sent to the corresponding user device 20. Further, the pickup possible weights and pickup possible volumes included in the recommendation notifications 57 sent to the user devices 20 are uniform. In the second embodiment, the pickup possible weight and pickup possible volume included in each recommendation notification 57 are changed depending on the position of a pickup location candidate 55.

Figure 8:
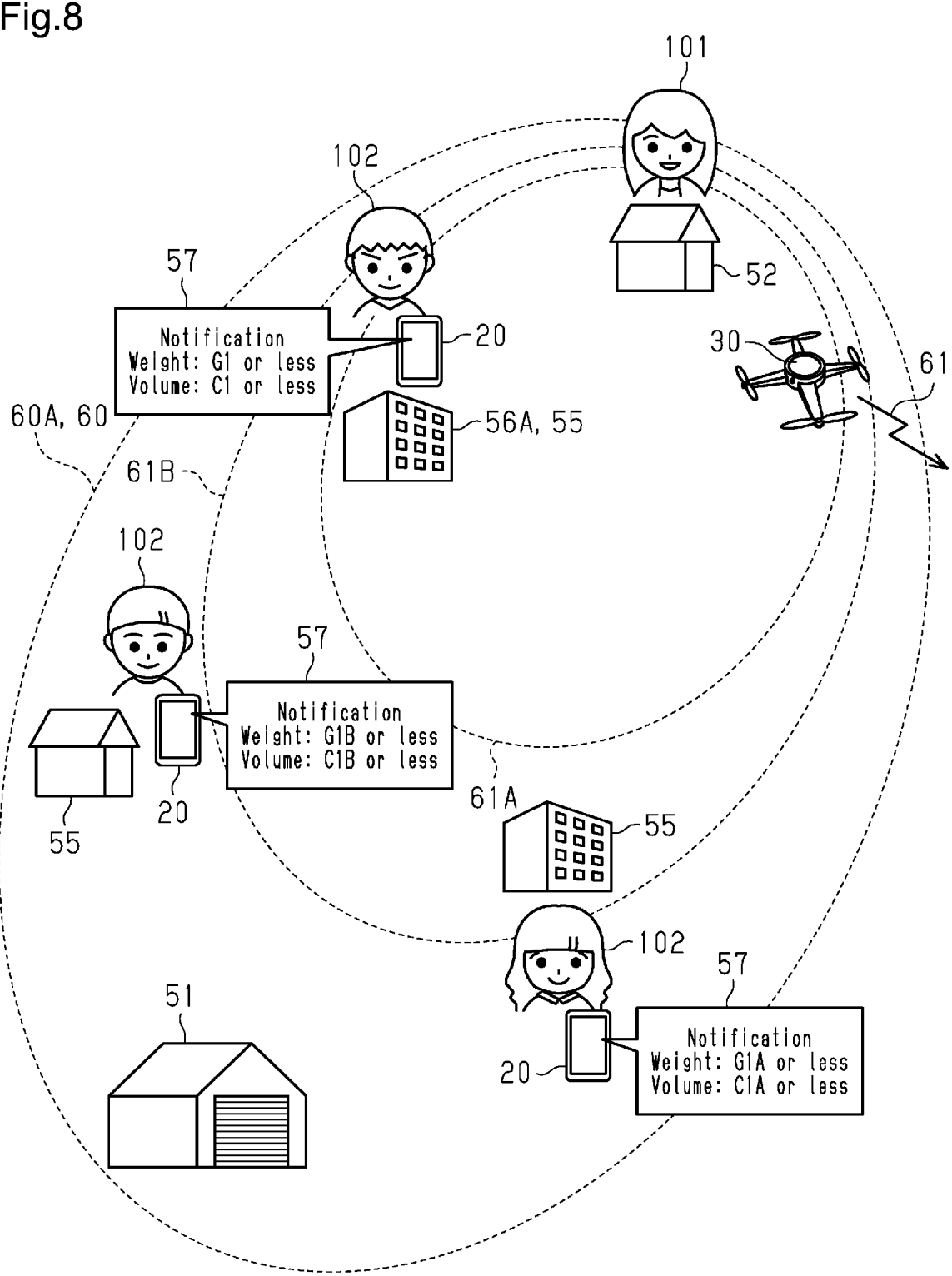
FIG. 8 is a diagram schematically illustrating a procedure for setting a fee according to a second embodiment.

A process in which the server 10 creates recommendation notifications 57 will now be described with reference to FIG. 8, using, as an example, a case where a first-time pickup location 56 is determined. The server 10 assumes that a pickup location candidate 55 having a long distance from the delivery address 52 has a short distance to the station 51. Thus, a recommendation notification 57 having a relatively large pickup possible weight and a relatively large pickup possible volume is sent to a pickup location candidate 55 having a long distance from the delivery address 52. Further, the server 10 assumes that a pickup location candidate 55 having a short distance from the delivery address 52 has a long distance to the station 51. Thus, a recommendation notification 57 having a relatively small pickup possible weight and a relatively small pickup possible volume is sent to a pickup location candidate 55 having a short distance from the delivery address 52.

An example of changing the pickup possible weight and the pickup possible volume depending on the position of a pickup location candidate 55 will now be described. The server 10 sets a first range 61A having a short distance from the delivery address 52 and sets a second range 61B having an intermediate distance from the delivery address 52. The pickup possible range 60A includes the first range 61A and the second range 61B. The second range 61B includes the first range 61A.

More specifically, the server 10 sends a recommendation notification 57 including the pickup possible weight G1 (e.g., less than or equal to 2 kg) and the pickup possible volume C1 (e.g., less than or equal to 80 cm) to the user device 20 corresponding to a pickup location candidate 55 included in the first range 61A, which is close to the delivery address 52. Further, the server 10 sends a recommendation notification 57 including a pickup possible weight G1A (e.g., less than or equal to 4 kg) and a pickup possible volume C1A (e.g., less than or equal to 140 cm) to the user device 20 corresponding to a pickup location candidate 55 that is included in the second range 61B and is not included in the first range 61A. The pickup possible weight G1A and the pickup possible volume C1A are set to be larger than the pickup possible weight G1 and the pickup possible volume C1, respectively. Furthermore, the server 10 sends a recommendation notification 57 including a pickup possible weight G1B (e.g., less than or equal to 10 kg) and a pickup possible volume C1B (e.g., less than or equal to 160 cm) to the user device 20 corresponding to a pickup location candidate 55 that is included in the pickup possible range 60 and is not included in the second range 61B. The pickup possible weight G1B and the pickup possible volume C1B are set to be larger than the pickup possible weight G1A and the pickup possible volume C1A, respectively. The server 10 registers, in the pickup location information 16, the pickup possible volume and the pickup possible weight included in each recommendation notification 57 that has been sent to the corresponding user 102.

When receiving a pickup request including the weight and volume of an item subject to a pickup, the server 10 refers to the pickup location information 16 corresponding to the pickup request to determine whether the pickup request satisfies the pickup possible weight and the pickup possible volume registered in the pickup location information 16. The server 10 determines, as the pickup location 56A, the pickup address corresponding to the earliest-accepted one of the pickup requests that satisfy the pickup possible weight and the pickup possible volume registered in the pickup location information 16. Likewise, the server 10 determines the second-time and subsequent pickup locations 56 with reference to the pickup location information 16. The server 10 does not have to set the first range 61A. Instead, the server 10 may obtain a relative distance from the delivery address 52 or the most recent pickup address for each pickup location candidate 55, calculate the pickup possible weight and the pickup possible volume depending on the relative distance, and include them in the corresponding recommendation notification 57.

The second embodiment provides the following advantage in addition to advantages (1-1) to (1-7) of the first embodiment.

(2-1) The longer the distance to a pickup location candidate 55, the larger the weight and volume of an item that is to be picked up from the pickup location candidate 55 are set. This minimizes the amount of energy consumed by an unmanned vehicle for a pickup. Accordingly, the number of pickups on the return path is increased.

Third Embodiment

The logistics system 1 according to a third embodiment will now be described. In the first and second embodiments, each recommendation notification 57 indicating a weight and a volume that allow for a pickup is sent to the corresponding user device 20 so as to determine the pickup location from the pickup requests 62 for the recommendation notifications 57. The third embodiment is different from the first embodiment in that the pickup location 56 is determined using the pickup location information 16 that stores the weight and volume of an item subject to a pickup.

In the third embodiment, the server 10 receives in advance, from one or more user devices 20, one or more pieces of request information including a pickup address, a delivery address, the weight of an item, and the volume of the item. The server 10 stores the received request information in the memory 12 as the pickup location information 16. In the third embodiment, the server 10 corresponds to a request registering unit in addition to the energy remaining amount identifying unit, the range setting unit, the pickup location determining unit, the weight updating unit, the volume updating unit, the first fee setting unit, and the second fee setting unit.

In the present embodiment, the energy remaining amount identifying unit estimates the remaining capacity of the battery 33 of the unmanned aerial vehicle 30 that is obtained subsequent to delivery of an item to the delivery address 52 by the unmanned aerial vehicle 30. Further, the energy remaining amount identifying unit refers to the movement distance in the pickup route 54 and the load weight of the unmanned aerial vehicle 30 to estimate the remaining capacity of the battery 33 of the unmanned aerial vehicle 30 that is obtained subsequent to the pickup of an item from the pickup address.

The request registering unit receives in advance, from one or more user device 20, one or more pieces of request information including a pickup address, a delivery address, the weight of an item, and the volume of the item. Then, the request registering unit stores the received request information in the memory 12 as the pickup location information 16.

A procedure of processes that determine the pickup location 56 in the third embodiment will now be described. The procedure is executed at least after the delivery address 52 is determined. For example, the procedure may be executed before the unmanned aerial vehicle 30 departs from the station 51 to the delivery address 52. This allows a pickup schedule to be made prior to the departure of the unmanned aerial vehicle 30. Alternatively, a process may be executed to determine the pickup location 56 while the unmanned aerial vehicle 30 is moving along the outbound path 53.

In the same manner as the first embodiment, the server 10 identifies the remaining capacity of the battery 33 obtained at the arrival of the delivery address 52. For example, the server 10 estimates the remaining capacity of the battery 33 based on the remaining capacity at the departure from the station 51, the length of the outbound path 53 for the unmanned aerial vehicle 30, and the like. Additionally, in the same as the first embodiment, the server 10 sets the pickup possible range 60A, pickup possible weight G1, and pickup possible volume C1 as the first-time pickup condition.

Then, the server 10 refers to the pickup location information 16 to determine the pickup location information 16 that satisfies the first-time pickup condition. That is, the server 10 searches for a pickup address which is included in the pickup possible range 60A and in which the weight of an item subject to the pickup is less than or equal to the pickup possible weight G1 and the volume of the item is less than or equal to the pickup possible volume C1.

After detecting the pickup location information 16 that satisfies the first-time pickup condition, the server 10 sends a pickup notification to the user device 20 of a user 102 who made the request. The user sees the pickup notification received by the user device 20 and confirms that his or her item will be picked up. The server 10 may finally determine the pickup when receiving, from the user device 20, the user's response indicating the approval of the delivery.

In the second-time delivery location determining process, the server 10 executes the same process as in the first-time delivery location determining process. That is, the server 10 estimates the remaining capacity of the battery 33 obtained at the arrival of the unmanned aerial vehicle 30 at the first-time pickup location 56A, and sets the pickup possible range 60B based on the estimated remaining capacity. Further, the server 10 updates the pickup possible weight G2 and pickup possible volume C2 of the second time based on the pickup possible weight G1 and the pickup possible volume C1 of the first time. The server 10 repeats the process until at least one of the following conditions is satisfied; namely, a condition in which the remaining capacity of the battery 33 falls below the remaining capacity that allows for a pickup, a condition in which the load weight and the load volume of an item each reaches its upper limit value, and a condition in which the pickup location information 16 that meets a pickup condition is not detected.

The advantage of the third embodiment will now be described.

(3-1) The server 10 uses request information including a pickup address, a delivery address, the weight of an item, and the volume of the item to search for the pickup location information 16 that satisfies the pickup condition. Thus, as compared with when a pickup possible notification is sent to the user device 20, the pickup location is immediately determined.

The above-described embodiments may be modified as follows. The above-described embodiments and the following modifications can be combined as long as the combined modifications remain technically consistent with each other.

Energy Remaining Amount Identifying Unit

In the case of estimating the remaining capacity Sn of the battery 33, the server 10 may compare the remaining capacity Sn with an actual remaining capacity Sac obtained from the unmanned aerial vehicle 30. If the difference between these capacities is large, the server 10 may correct the remaining capacity Sn of the battery 33 that is used to determine the subsequent pickup locations 56. In this case, the estimated value of the remaining capacity Sn is made closer to the actual remaining capacity Sac. Alternatively, in a case where the unmanned aerial vehicle 30 includes a weight sensor, the unmanned aerial vehicle 30 may send a load weight Gac to the server 10 at a predetermined interval. The server 10 may use the current location of the unmanned aerial vehicle 30 to compare the load weight Gac obtained from the unmanned aerial vehicle 30 with a pickup possible weight Gn calculated from the server 10 and to determine whether there is any difference between these weights. If there is a difference between the load weight Gac, which is obtained from the unmanned aerial vehicle 30, and the pickup possible weight Gn, the server 10 may correct the estimated pickup possible weight Gn so as to become closer to the load weight Gac.

Notification Sending Unit

In the first and second embodiments, each recommendation notification 57 is sent to the corresponding user 102 of which the pickup location information 16 is registered. In the third embodiment, the server 10 detects the pickup location information 16 that satisfies the pickup condition. Instead, in a case where an address included in the user information 15 is within the pickup possible range 60, a recommendation notification 57 or the like may be sent to the user device 20 corresponding to the user information 15. When the user device 20 sends a pickup request to the recommendation notification 57, the server 10 may assume that there is baggage subject to a pickup and register it in the pickup location information 16. The pickup request sent from the user device 20 may include a pickup address, a delivery address, the weight of baggage, and the volume of that baggage. In this configuration, pickup service is offered to users who may potentially request that their items be picked up.

In each of the above-described embodiments, the pickup location information 16 stored in advance is used to determine the pickup location. Instead of or in addition to the pickup location information 16, the current location of the user device 20 may be used. For example, the server 10 may obtain the current location from a user device 20 that functions to detect the current location and send a recommendation notification 57 to the user device 20 that is currently located in the pickup possible range 60.

In the first and second embodiments, every time the server 10 sets the pickup possible range 60, the server 10 sends recommendation notifications 57. Instead, the server 10 may send each recommendation notification 57 to the corresponding pickup location candidate 55 located in the first-time pickup possible range 60A only when setting the pickup possible range 60A. In this case, the server 10 may set, as pickup location candidates 55, the pickup addresses of users who issued pickup requests for the recommendation notifications 57 and determine the second and subsequent pickup locations 56 from these pickup location candidates 55.

In the second embodiment, the pickup possible weight included in a recommendation notification 57 is set to be larger as the relative distance from the delivery address 52 or the most recent pickup location 56 to the next pickup location 56 becomes longer. Instead, it may be assumed that the distance from the pickup location 56 to the station 51 becomes longer as the relative distance from a movement route that connects the delivery address 52 or the most recent pickup location 56 to the station 51 by the shortest distance becomes longer. Thus, the pickup possible weight included in a recommendation notification 57 may be set to be larger as the relative distance from the movement path becomes shorter, and the pickup possible weight included in a recommendation notification 57 may be set to be smaller as the relative distance from the movement path becomes longer. This configuration minimizes the power of electric power consumed by the unmanned aerial vehicle 30 for a pickup.

Unmanned Aerial Vehicle

When the unmanned aerial vehicle 30 includes a sensor that detects wind direction and wind speed, the controller 35 of the unmanned aerial vehicle 30 obtains, from the sensor, wind information that includes at least one of wind direction and wind speed. Alternatively, the server 10 or the unmanned aerial vehicle 30 may obtain the current location of the unmanned aerial vehicle 30 and obtain wind information from a sensor located at a fixed position near the current location. The server 10 may set the pickup possible range 60 based on wind information. For example, the server 10 may set a narrower pickup possible range 60 as the deviation between the wind direction and the movement direction of the unmanned aerial vehicle 30 toward the station 51 becomes larger and the wind speed becomes higher (i.e., as headwind becomes stronger). The server 10 may set a broader pickup possible range 60 as the deviation between the wind direction and the movement direction of the unmanned aerial vehicle 30 toward the station 51 becomes smaller and the wind speed becomes higher (i.e., as tailwind becomes stronger). Alternatively, the server 10 may estimate the remaining capacity of the battery 33 from the wind information. The server 10 may set a narrower pickup possible range 60 as the deviation between the wind direction and the movement direction of the unmanned aerial vehicle 30 toward the station 51 becomes larger and the wind speed becomes higher (i.e., as headwind becomes stronger). The server 10 may set a broader pickup possible range 60 as the deviation between the wind direction and the movement direction of the unmanned aerial vehicle 30 toward the station 51 becomes smaller and the wind speed becomes higher (i.e., as tailwind becomes stronger).

Figure 9:
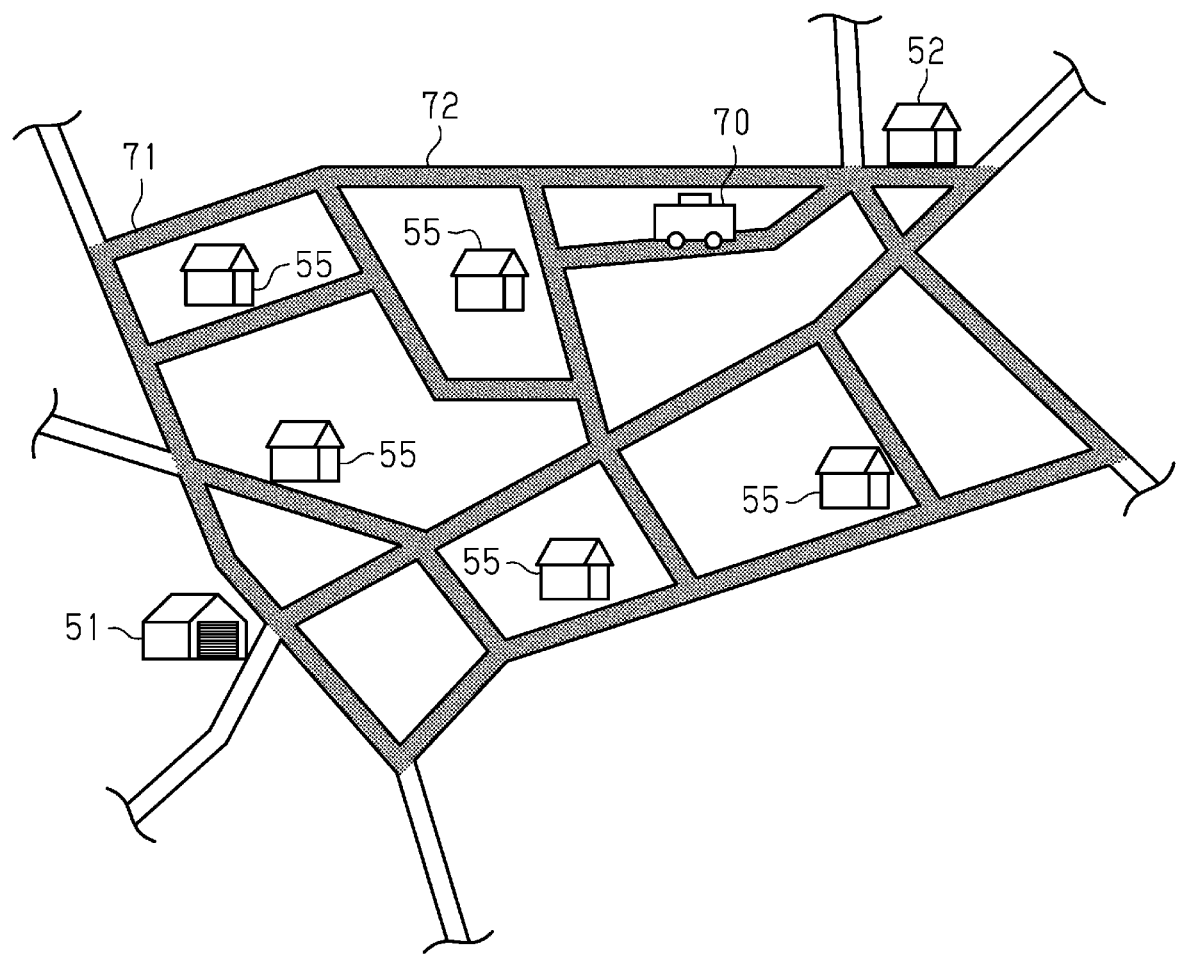
FIG. 9 is a diagram schematically illustrating a pickup process according to a modification.

In each of the above-described embodiments, the unmanned aerial vehicle 30 is used as an unmanned vehicle. Instead, as shown in FIG. 9, the unmanned vehicle may be an autonomous guided vehicle 70 that travels along a road 71 without a person onboard. The autonomous guided vehicle 70 includes at least one of an electric motor and an engine as the drive source of the drive unit 32. The autonomous guided vehicle 70 further includes an energy source that corresponds to the drive source. The energy source is a battery or a fuel supplying unit. In the case of using the autonomous guided vehicle 70, the processes that determine a pickup location are executed in almost the same manner as in each of the above-described embodiments. In the same manner as the above-described embodiments, the pickup possible range of the autonomous guided vehicle 70 may be an oval shape that is set according to the remaining capacity of the battery 33 with reference to the delivery address 52 and the station 51. Alternatively, the pickup possible range of the autonomous guided vehicle 70 may correspond to the movement of the autonomous guided vehicle 70. For example, the pickup possible range of the autonomous guided vehicle 70 may be determined based on road information. The road information includes, for example, node information that is set for an intersection or the like and link information that is set between nodes. The link information includes information related to a link cost. The link cost includes information, such as the length of a link and a longitudinal slope. For example, when determining a first-time pickup location, the server 10 refers to the link cost to estimate the amount of energy consumed by the autonomous guided vehicle 70. As shown by the shaded lines in FIG. 9, the server 10 refers to the energy remaining amount of the autonomous guided vehicle 70 to determine a range 72 for pickup addresses along a street network. The range 72 refers to a range where the autonomous guided vehicle 70 is able to return to the station 51 via pickup locations from the delivery address 52. In the same manner as described above, the autonomous guided vehicle 70 may determine a pickup location.

Pickup Route on Return Path

In the above-described embodiments, the unmanned aerial vehicle 30 merely picks up an item on the return path. Instead, the unmanned aerial vehicle 30 may pick up an item and deliver that item on the return path. For example, when determining a second-time pickup location 56, the server 10 refers to the pickup location information 16 to determine whether a delivery address from which a pickup request subject to determination was issued is included in the pickup possible range 60A. When the delivery address is included in the pickup possible range 60A, the server 10 determines whether the unmanned aerial vehicle 30 is able to further return to the station 51 via the delivery address from the pickup location 56A. Based on the distance from the pickup location 56 to the delivery address to which the item picked up at the pickup location 56 is delivered and based on the pickup possible weight G1 and the pickup possible volume C1 to which the weight and volume of the picked-up item are respectively added, the server 10 estimates the remaining capacity of the battery 33 at the delivery address. After the delivery of the item to the delivery address, the pickup possible weight G1 and the pickup possible volume C1 respectively decrease by amounts corresponding to the weight GA and volume CA of the delivered item and return to initial values. Thus, the server 10 calculates the remaining capacity of the battery 33 at the delivery address, the distance from the delivery address to the station 51, and a pickup possible weight G1' and a pickup possible volume C1' that are obtained by respectively subtracting the weight and volume of an item to be delivered from the pickup possible weight G1 and the pickup possible volume C1. Then, the server 10 refers to the values of these parameters to determine whether the unmanned aerial vehicle 30 is able to return to the station 51 via the delivery address. When determining that the unmanned aerial vehicle 30 is unable to return to the station 51 via the delivery address from the pickup location 56A, the server 10 sends, to the unmanned aerial vehicle 30, an instruction to return to the station 51 without stopping by the delivery address. Alternatively, when a user 102 issues a pickup request based on a condition in which an item is immediately delivered subsequent to the pickup, the server 10 may determine that the server 10 is unable to respond to the request and decline the pickup request. When determining that the unmanned aerial vehicle 30 is able to return to the station 51 via the delivery address, the server 10 sends, to the unmanned aerial vehicle 30, information of the delivery address and an instruction to move to the delivery address. This causes the unmanned aerial vehicle 30 to move from the pickup location 56 to the delivery address. When the delivery is completed, the server 10 identifies the remaining capacity of the battery 33 at the delivery address (step S10) with the delivery address used as a start point, and repeats steps S10 to S17 based on the remaining capacity.

Configuration of Logistics System

The logistics system 1 may include a manager device in addition to the server 10, the user device 20, and the unmanned aerial vehicle 30. The manager device is used by a manager who manages the logistics system 1 or by a manager who manages the unmanned aerial vehicle 30. For example, a manager offers the service of delivering an item to a user and picking up an item from a user. The manager device may be a smartphone (multi-functional telephone terminal), a tablet terminal, a personal computer, a wearable computer, or another information processing device capable of displaying images, and thus has almost the same configuration as the user device 20. For example, a configuration may be employed in which the server 10 or the like creates a list of pickup location candidates 55 and the manager sees the list using a manager terminal. The manager terminal may send recommendation notifications to the user devices 20 of pickup location candidates 55 that are displayed in the list based on an instruction from the manager. Alternatively, the manager terminal may receive a selection operation performed by a user among pickup requests received from a user device 20 and send a pickup notification to the user device 20. In short, a process based on the manager's operation simply needs to be executed in each process executed by the server 10 of the above-described embodiments.

In the above-described embodiments, the server 10 functions as the energy remaining amount identifying unit, the range setting unit, the pickup location determining unit, the notification sending unit, the request receiving unit, the weight updating unit, the volume updating unit, the first fee setting unit, the second fee setting unit, and the request registering unit. Instead, the unmanned aerial vehicle 30 may execute at least one of these functions. In a case where the unmanned aerial vehicle 30 executes some of the above-described processes and the server 10 executes the remaining processes, the unmanned aerial vehicle 30 and the server 10 send and receive the results of the processes to and from each other if the results need to be shared.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A logistics system, comprising:
one or more computers configured to execute a logistic management program, the logistics management program comprising:
energy remaining amount identifying code configured to cause the one or more computers to obtain or estimate an energy remaining amount of an unmanned vehicle subsequent to delivery of an item to a delivery address, the unmanned vehicle being driven by energy supplied from an energy source;
range setting code configured to cause the one or more computers to set a pickup possible range according to the energy remaining amount, the pickup possible range being used to select pickup location candidates where the unmanned vehicle is able to pick up an item and return to a station of the unmanned vehicle on a return path without a recharge of the energy source, the return path including the delivery address as a start point and including the station as an end point;
pickup location determining code configured to cause the one or more computers to determine a pickup location from the pickup location candidates located in the pickup possible range; and
delivery instruction code configured to cause the one or more computers to instruct the unmanned vehicle to move to the pickup location, whereby the unmanned vehicle begins to move toward the pickup location.

2. The logistics system according to claim 1, the logistics management program comprising further comprising:
notification sending code configured to cause the one or more computers to detect the pickup location candidates located in the pickup possible range and causing a pickup possible notification to be displayed on a user device, wherein the pickup possible notification corresponds to each of the detected pickup location candidates, the pickup possible notification indicating that an item is capable of being picked up; and
request receiving code configured to cause the one or more computers to receive, from the user devices, pickup requests for the pickup possible notifications,
wherein the pickup location determining code is further configured to determine a pickup location from the pickup location candidates associated with the pickup requests.

3. The logistics system according to claim 2, wherein each of the pickup possible notifications includes a weight of an item capable of being picked up, and
the weight of the item capable of being picked up included in the pickup possible notification is set to be larger as a relative distance from the delivery address or a most recent pickup location to one of the pickup location candidates becomes longer, the most recent pickup location being a waypoint.

4. The logistics system according to claim 2, wherein each of the pickup possible notifications includes a weight of an item capable of being picked up, and
the weight of the item capable of being picked up included in the pickup possible notification is set to be larger as a relative distance from a route that connects the station to the delivery address or a most recent pickup location by a shortest distance becomes shorter, the most recent pickup location being a waypoint.

5. The logistics system according to claim 1, wherein the energy remaining amount identifying code is further configured to:
estimate an energy remaining amount in the energy source of the unmanned vehicle subsequent to movement to the pickup location every time the pickup location determining code determines the pickup location; and
determine whether the energy remaining amount allows for a subsequent pickup and repeat a process that determines the pickup location from the pickup location candidates only when the energy remaining amount allows for the subsequent pickup.

6. The logistics system according to claim 1, the logistics management program further comprising weight updating code configured to subtract, from a pickup possible weight for the unmanned vehicle, a weight of an item to be picked up at the pickup location and update the pickup possible weight every time the pickup location is determined, wherein the pickup location determining code is further configured to determine, as a new pickup location, one or more of the pickup location candidates where a weight of an item subject to a pickup is less than or equal to the pickup possible weight when determining the new pickup location from the pickup location candidates.

7. The logistics system according to claim 6, further comprising first fee setting code configured to cause the one or more computers to set, when there are a number of pickups on the return path, a lower pickup fee for a pickup having a later order among the pickups.

8. The logistics system according to claim 1, the logistics management program further comprising volume updating code configured to cause the one or more computers to subtract, from a pickup possible volume for the unmanned vehicle, a volume of an item to be picked up at the pickup location and update the pickup possible volume every time the pickup location is determined, wherein the pickup location determining code is further configured to determine, as a new pickup location, one or more of the pickup location candidates where a volume of an item subject to a pickup is less than or equal to the pickup possible volume when determining the new pickup location from the pickup location candidates.

9. The logistics system according to claim 1, the logistics management program further comprising second fee setting code configured to set a pickup fee in a case of requesting a pickup on the return path of the unmanned vehicle to be lower than a pickup fee in a case where the unmanned vehicle in an unloaded state moves from the station to a pickup location, pick up an item at the pickup location, and return to the station.

10. The logistics system according to claim 1, the logistics management program further comprising request registering code configured to receive, from one or more user devices, one or more pieces of request information including a pickup address, a delivery address, a weight of an item, and a volume of the item and store the one or more pieces of request information in a memory as pickup location information, wherein the pickup location determining code is further configured to search for the pickup location information, detect one or more pieces of request information indicating that the pickup address is included in the pickup possible range, the weight of the item is less than or equal to a pickup possible weight for the unmanned vehicle, and the volume of the item is less than or equal to a pickup possible volume for the unmanned vehicle, and determine, as a pickup location, one of the detected one or more pieces of the request information.

11. A logistics management method for causing one or more computers included in a logistics system to:
identify an energy remaining amount of an unmanned vehicle subsequent to delivery of an item to a delivery address, the unmanned vehicle being driven by energy supplied from an energy source;
set a pickup possible range according to the energy remaining amount, the pickup possible range being used to select pickup location candidates where the unmanned vehicle is able to pick up an item and return to a station of the unmanned vehicle on a return path without a recharge of the energy source, the return path including the delivery address as a start point and including the station as an end point;
determine a pickup location from the pickup location candidates located in the pickup possible range; and
instruct the unmanned vehicle to move to the pickup location, whereby the unmanned vehicle begins to move toward the pickup location.

12. A computer-readable medium that stores a logistic management program for execution by one or more computers included in a logistics system, the logistic management program comprising:
energy remaining amount identifying code configured to cause the one or more computers to obtain or estimate an energy remaining amount of an unmanned vehicle subsequent to delivery of an item to a delivery address, the unmanned vehicle being driven by energy supplied from an energy source;
range setting code configured to cause the one or more computers to set a pickup possible range according to the energy remaining amount, the pickup possible range being used to select pickup location candidates where the unmanned vehicle is able to pick up an item and return to a station of the unmanned vehicle on a return path without a recharge of the energy source, the return path including the delivery address as a start point and including the station as an end point;
pickup location determining code configured to cause the one or more computers to determine a pickup location from the pickup location candidates located in the pickup possible range; and
delivery instruction code configured to cause the one or more computers to instruct the unmanned vehicle to move to the pickup location, whereby the unmanned vehicle begins to move toward the pickup location.

* * * * *